United States Patent
Singi et al.

(10) Patent No.: US 10,922,654 B2
(45) Date of Patent: Feb. 16, 2021

(54) SOFTWARE ASSURANCE AND TRUST IN A DISTRIBUTED DELIVERY ENVIRONMENT

(71) Applicant: Accenture Global Solutions Limited, Dublin (IE)

(72) Inventors: Kapil Singi, Bangalore (IN); Vikrant S. Kaulgud, Pune (IN); Sanjay Podder, Maharashtra (IN); Afsal Marattil, Kerala (IN); Pradeepkumar Duraisamy Soundrapandian, Sivakasi (IN)

(73) Assignee: Accenture Global Solutions Limited, Dublin (IE)

( * ) Notice: Subject to any disclaimer, the term of this patent is extended or adjusted under 35 U.S.C. 154(b) by 121 days.

(21) Appl. No.: 15/885,636

(22) Filed: Jan. 31, 2018

(65) Prior Publication Data
US 2019/0236548 A1 Aug. 1, 2019

(51) Int. Cl.
*G06Q 10/10* (2012.01)
*G06Q 20/08* (2012.01)
(Continued)

(52) U.S. Cl.
CPC ......... *G06Q 10/103* (2013.01); *G06Q 20/085* (2013.01); *G06Q 20/356* (2013.01);
(Continued)

(58) Field of Classification Search
CPC .......... G06F 21/552; G06F 21/57; G06F 8/70; G06F 8/71; G06F 11/3086;
(Continued)

(56) References Cited

U.S. PATENT DOCUMENTS

| 9,778,930 | B2 * | 10/2017 | Dimitrakos | ............... G06F 8/61 |
| 2008/0082448 | A1 * | 4/2008 | Meijer | ................... G06F 21/10 705/14.69 |
| 2010/0161496 | A1 * | 6/2010 | Zalewski | ............. G06Q 50/188 705/80 |
| 2013/0091486 | A1 * | 4/2013 | Gemmell | ........... G06Q 10/0639 717/104 |

(Continued)

OTHER PUBLICATIONS

L. Bouwmeester et al.; Compliance Test Framework; academia; pp. 97-117; retrieved on Oct. 8, 2020 (Year: 2009).*
(Continued)

*Primary Examiner* — S. Sough
*Assistant Examiner* — Cuong V Luu
(74) *Attorney, Agent, or Firm* — Harrity & Harrity, LLP

(57) ABSTRACT

A device may receive information regarding a software environment and/or one or more modules associated with the software environment; receive information regarding one or more compliance requirements; determine one or more smart contracts based on the information regarding the one or more compliance requirements and the information regarding the software environment and/or the one or more modules associated with the software environment; obtain data regarding the software environment and/or the one or more modules; determine, using the one or more smart contracts, whether the data satisfies the one or more compliance requirements; and add at least part of a block, to a blockchain, to indicate whether the data satisfies the one or more compliance requirements, for realization of a reward or penalty associated with the one or more compliance requirements.

20 Claims, 11 Drawing Sheets

(51) Int. Cl.
*G06Q 20/34* (2012.01)
*G07F 19/00* (2006.01)
*G07F 9/00* (2006.01)
*G07G 1/00* (2006.01)
*G06F 8/77* (2018.01)

(52) U.S. Cl.
CPC ......... *G06Q 20/3552* (2013.01); *G07F 9/006* (2013.01); *G07F 19/206* (2013.01); *G07F 19/211* (2013.01); *G07G 1/0009* (2013.01); *G06F 8/77* (2013.01)

(58) Field of Classification Search
CPC .. G06F 11/3604; G06F 8/427; G06F 11/3055; G06F 17/30864; G06F 8/10; G06F 9/5055; G06F 8/77; G06Q 10/103; G06Q 20/085; G06Q 20/3552; G06Q 20/356; G07F 9/006; G07F 19/206; G07F 19/211; G07G 1/0009
See application file for complete search history.

(56) References Cited

U.S. PATENT DOCUMENTS

| | | | |
|---|---|---|---|
| 2015/0012645 A1* | 1/2015 | Harris | H04L 41/5009 709/224 |
| 2016/0139915 A1* | 5/2016 | Dimitrakos | G06F 8/61 717/126 |
| 2018/0025166 A1* | 1/2018 | Daniel | G06Q 10/06 713/189 |
| 2018/0225466 A1* | 8/2018 | Ducatel | G06Q 20/065 |

OTHER PUBLICATIONS

Panuchart Bunyakiati et al.; The Compliance Testing of Software Tools with respect to the UML standards specification the ArgoUML case study; IEEE; pp. 138-143; retrieved on Oct. 8, 2020 (Year: 2009).*

* cited by examiner

SOFTWARE ASSURANCE AND TRUST IN A DISTRIBUTED DELIVERY ENVIRONMENT

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties.

SUMMARY

A device may include one or more memories and one or more processors communicatively coupled to the one or more memories. The one or more processors may be configured to receive information regarding a software environment and/or one or more modules associated with the software environment; receive information regarding one or more compliance requirements; determine one or more smart contracts based on the information regarding the one or more compliance requirements and the information regarding the software environment and/or the one or more modules associated with the software environment; obtain data regarding the software environment and/or the one or more modules; determine, using the one or more smart contracts, whether the data satisfies the one or more compliance requirements; and add at least part of a block, to a blockchain, to indicate whether the data satisfies the one or more compliance requirements, for realization of a reward or penalty associated with the one or more compliance requirements.

A method may include receiving, by one or more computer resources of a compliance platform, information regarding a software environment; receiving, by one or more computer resources of the compliance platform, information regarding one or more compliance requirements for a module or build to be developed in the software environment; determining, by one or more computer resources of the compliance platform, one or more smart contracts based on the information regarding the software environment and the information regarding the one or more compliance requirements; obtaining, by one or more computer resources of the compliance platform and from a blockchain, data regarding the software environment; determining, by one or more computer resources of the compliance platform and using the one or more smart contracts, whether the data satisfies the one or more compliance requirements; and adding, by one or more computer resources of the compliance platform, at least part of a block to the blockchain to indicate whether the data satisfies the one or more compliance requirements, for realization of a reward or penalty associated with the one or more compliance requirements.

A non-transitory computer-readable medium may store instructions, the instructions comprising: one or more instructions that, when executed by one or more processors, cause the one or more processors to: receive first information regarding a software environment and/or one or more modules developed using the software environment; receive second information regarding one or more compliance requirements; determine one or more smart contracts based on the first information and the second information; obtain data regarding activity of the software environment and/or the one or more modules; determine, using the one or more smart contracts, whether the data satisfies the one or more compliance requirements; add at least part of a block, to a blockchain, to indicate whether the data satisfies the one or more compliance requirements;

and realize a reward or penalty based on the at least part of a block and using the blockchain.

DETAILED DESCRIPTION

Figure 1A:
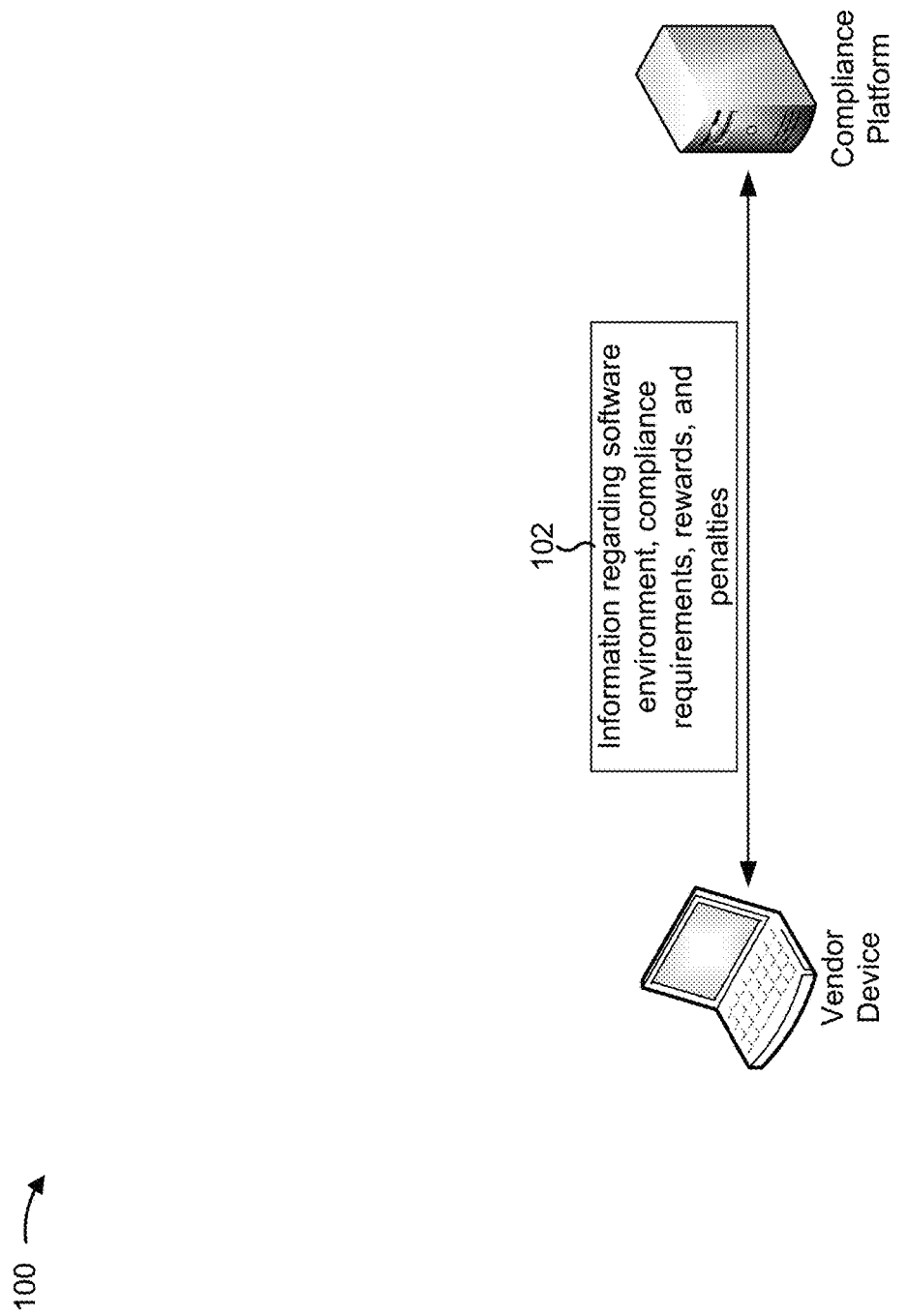
FIGS. 1A-1C are diagrams of an overview of an example implementation described herein.

The following detailed description of example implementations refers to the accompanying drawings. The same reference numbers in different drawings may identify the same or similar elements.

An entity may engage a software developer to develop software for the entity. For example, the entity may engage the software developer to develop a particular module, to deliver certain milestones, to complete a particular stage or aspect of a project, and/or the like. The entity may require that the software developer comply with certain compliance requirements. For example, compliance requirements may include business compliance, such as a process-level business compliance (e.g., a bank account should be made active only once an audit is completed) or a software-level business compliance (e.g., each healthcare entity must have a unique national provider identifier number as per regulation). As another example, compliance requirements may include technical compliances, such as a software-level functional compliance (e.g., a user interface of the system should associate labels explicitly with controls) or third-party software component compliance (e.g., the system should use particular software infrastructure or particular software build components).

It may be difficult for the entity to ensure that the compliance requirements are satisfied. For example, the entity may interact with multiple software vendors, crowd-sourced software vendors, or other assortments of software vendors in a distributed delivery environment (e.g., an environment where deliverables are received from multiple different vendors associated with different software environments and/or expertises). As another example, software vendors may operate in a non-transparent and not inherently trustworthy fashion. In other words, the entity may have no assurance that a software vendor is telling the truth with regard to compliance requirements. As yet another example, there may be a wide variety of compliance requirements to which a software developer is to adhere. Still further, data, metrics, and policies may be isolated within a particular software developer's environment.

Some implementations described herein provide a blockchain-based framework that automatically extracts compliance-related data from a software developer's ecosystem and saves the compliance-related data as a block of a blockchain. Then, a compliance analysis is performed using smart contracts to make sure that the software developer and/or the application being developed by the software developer is adhering to compliance requirements. Thus, an immutable shared platform enables trust, transparency, and visibility between the entity and software developers. Furthermore, automatic determination of the compliance-related data improves reliability and trustworthiness of the compliance-related data and reduces reliance on human actors to gather such data. Still further, the usage of the blockchain and smart contracts may improve auditability and objectivity of the compliance process.

Figure 1B:
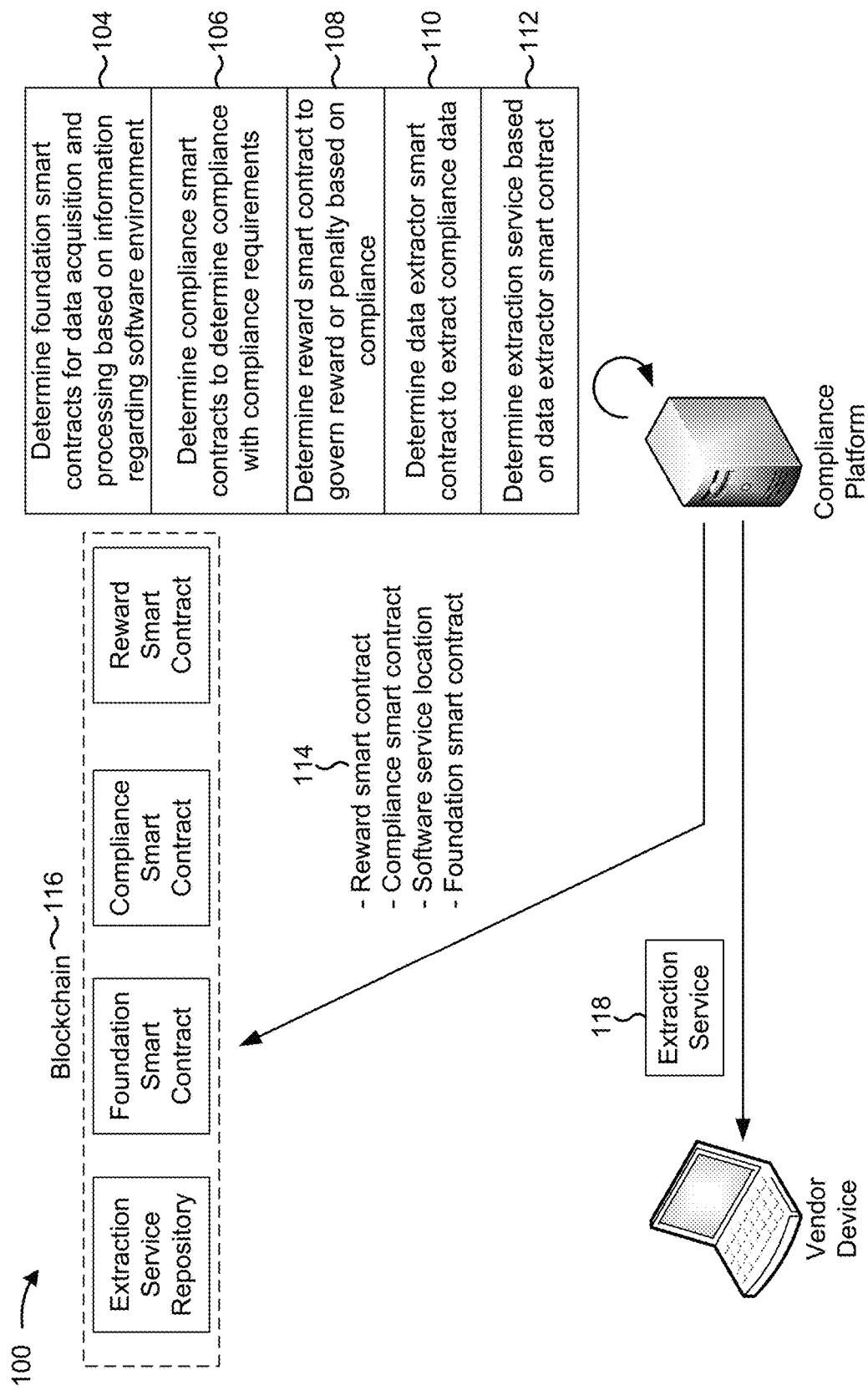
Figure 1C:
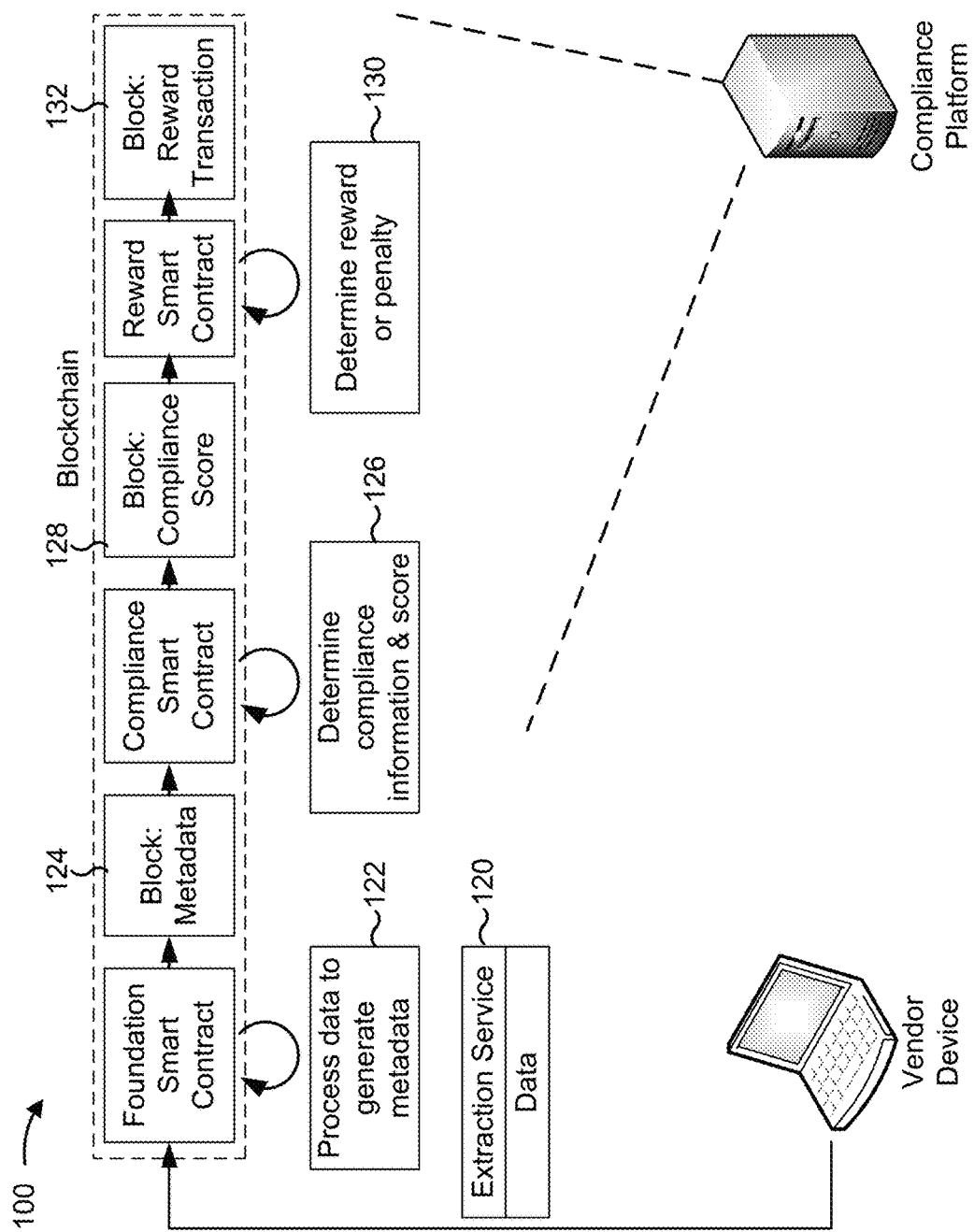

FIGS. 1A-1C are diagrams of an overview of an example implementation 100 described herein. As shown in FIG. 1A, and by reference number 102, an entity associated with a vendor device (e.g., a vendor, a software developer, a counterparty, etc.) and an entity associated with a compliance platform (e.g., a party, a client, a service provider, etc.) may exchange information regarding a software environment, compliance requirements, rewards, and/or penalties. A compliance requirement may include any condition or logical test that can be determined based on data and using a smart contract. For example, a compliance requirement may relate to a process-level business compliance, a software-level business compliance, a software-level functional compliance, a software infrastructure compliance, a software build component compliance, and/or another type of compliance. A reward may include monetary or non-monetary compensation for satisfying a compliance requirement. A penalty may include monetary or non-monetary fines or other consequences for not satisfying a compliance requirement. In some implementations, a device (e.g., the vendor device or a device associated with the compliance platform) may provide information to the compliance platform identifying the software environment, the compliance requirement, the rewards, and/or the penalties.

As shown in FIG. 1B, the compliance platform may determine smart contracts based on the software environment, the compliance requirement, the rewards, and/or the penalties. A smart contract is a self-executing contract with the terms of the agreement between two parties being written into lines of code. The code and agreements contained therein exist across a distributed, decentralized blockchain network. Smart contracts permit trusted transactions and agreements to be carried out among disparate, anonymous parties without the need for a central authority, legal system, or external enforcement mechanism.

As shown by reference number 104, the compliance platform may determine one or more foundation smart contracts for data acquisition and processing based on the information regarding the software environment, as described in more detail elsewhere herein. As shown by reference number 106, the compliance platform may determine one or more compliance smart contracts to determine whether conditions associated with compliance requirements are satisfied, as described in more detail elsewhere herein. As shown by reference number 108, the compliance platform may determine one or more reward smart contracts to govern rewards or penalties based on compliance with the compliance requirements.

As shown by reference number 110, the compliance platform may determine a data extractor smart contract. The data extractor smart contract may generate an extraction service based on the software environment (e.g., based on modules and/or configuration of the software environment). The extraction service may extract data from the software environment for determining compliance with the requirements. For example, as shown by reference number 112, the compliance platform may generate an extraction service based on the data extractor smart contract, as described in more detail elsewhere herein.

As shown by reference number 114, the compliance platform may add the one or more reward smart contracts, the one or more compliance smart contracts, the one or more foundation smart contracts, and/or information identifying a location associated with the extraction service to a blockchain, shown by reference number 116. For example, the blockchain may be accessible by the vendor device and the compliance platform. The vendor device (e.g., an extraction service associated with the vendor device) and the compliance platform may be capable of adding information to the blockchain, thereby storing the information in a trustworthy and transparent database that cannot be retroactively changed. In some implementations, the smart contracts may be stored in the blockchain. In some implementations, the smart contracts may be stored by another device, and outputs of the smart contracts may be added to the blockchain. In some implementations, one or more of the smart contracts may be stored in the blockchain, and one or more of the smart contracts may be stored by another device.

As shown by reference number 118, in some implementations, the compliance platform may provide the extraction service to the vendor device. In some implementations, the vendor device may obtain the extraction service. For example, the vendor device may read the blockchain to determine the location associated with the extraction service and may obtain the extraction service from the location.

As shown in FIG. 1C, and by reference number 120, the extraction service may extract or provide data regarding the vendor device. For example, the extraction service may listen to software activity (e.g., a successful build or a test completion) and may capture the relevant data regarding the vendor service (e.g., compliance data). As a more particular example, on the occurrence of a successful build, the extraction service may extract third-party component information from a build file (e.g., Maven, Gradle, node module, etc.) for a "third party component" compliance type. Next, the compliance platform may compose the various heterogeneously-formatted data, extracted by the extraction service, into a predefined metadata format for each compliance type, and may upload the data to the repository. Here, the data is shown as an input to a foundation smart contract associated with the blockchain. In some implementations, the compliance platform may receive the data from the vendor device, and may input the data to the foundation smart contract.

As shown by reference number 122, the foundation smart contract (e.g., the compliance platform) may process the data to generate metadata. For example, the metadata may include information regarding the software environment associated with the vendor device, such as information regarding modules, environments, and/or the like associated with the software environment. As shown by reference number 124, the compliance platform may add the metadata to the blockchain (e.g., in a block of the blockchain).

As shown by reference number 126, the compliance smart contract (e.g., the compliance platform) may determine compliance information based on the metadata. For example, the compliance smart contract may determine whether the metadata indicates that the vendor device (e.g., the software environment) is compliant with the compliance requirement. In some implementations, the compliance smart contract (or a different smart contract, described in more detail below) may output a compliance score indicating a level of compliance with the compliance requirement. Additionally, or alternatively, the compliance platform may determine a composite compliance score based on a combination of multiple, different compliance scores, as described in more detail elsewhere herein. As shown by reference number 128, the compliance platform may add the compliance score to the blockchain (e.g., in a block).

As shown by reference number 130, the reward smart contract may determine a reward or a penalty based on the compliance score. For example, the reward smart contract may determine whether the compliance score satisfies one or more thresholds, and may determine a corresponding reward or penalty based on whether the compliance score satisfies the one or more thresholds. As shown by reference number 132, the compliance platform may add a transaction to transact the reward or penalty to the blockchain. In some implementations, the compliance platform may provide information to the vendor device identifying the reward or penalty.

In this way, the usage of the blockchain and smart contracts enables trust, transparency, and visibility between the compliance platform and software developers associated with the vendor device. Furthermore, automatic determination of the metadata and/or the compliance scores improves reliability and trustworthiness of the metadata and reduces reliance on human actors to gather such data. Still further, the usage of the blockchain and smart contracts may improve auditability and objectivity of the compliance process.

As indicated above, FIGS. 1A-1C are provided merely as an example. Other examples are possible and may differ from what was described with regard to FIGS. 1A-1C.

Figure 2:
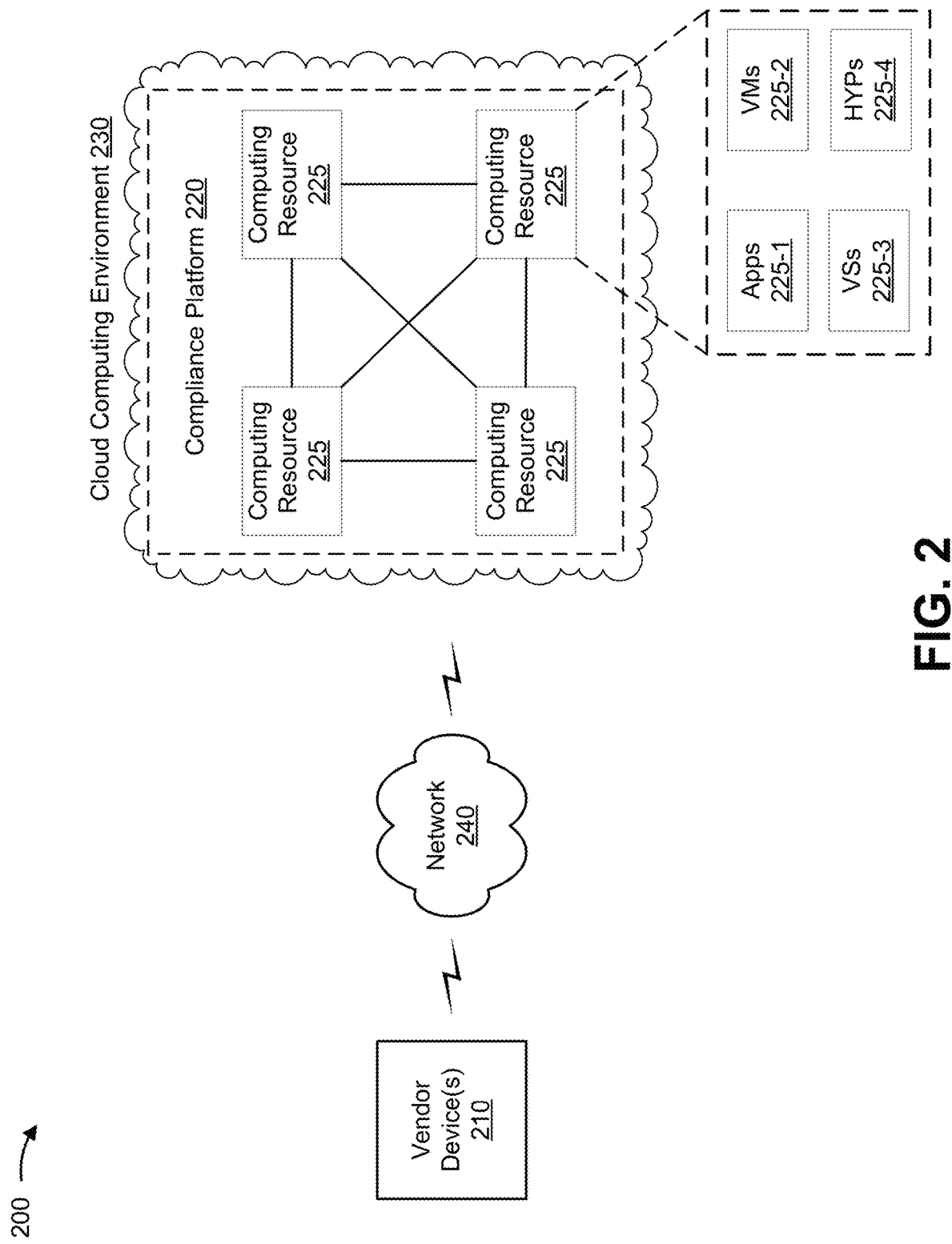
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a vendor device 210, a compliance platform 220, a computing resource 225, a cloud computing environment 230, and a network 240. Devices of environment 200 may interconnect via wired connections, wireless connections, or a combination of wired and wireless connections.

Vendor device 210 includes one or more devices capable of receiving, generating, storing, processing, and/or providing information associated with a software environment. For example, vendor device 210 may include a user device (e.g., a laptop computer, a desktop computer, etc.), a server, a group of servers, and/or the like. In some implementations, vendor device 210 may be implemented in a cloud environment. For example, vendor device 210 may be implemented by one or more computer devices of a cloud computing environment (e.g., cloud computing environment 230) or a data center.

Compliance platform 220 includes one or more devices capable of receiving, generating, storing, processing, and/or providing information associated with determining compliance of a software environment using a blockchain and/or smart contracts. For example, compliance platform 220 may include a server, a group of servers, and/or the like. In some implementations, compliance platform 220 may be partially or entirely implemented in cloud computing environment 230.

Cloud computing environment 230 includes an environment that delivers computing as a service, whereby shared resources, services, etc. may be provided to vendor device 210 and/or compliance platform 220. Cloud computing environment 230 may provide computation, software, data access, storage, and/or other services that do not require end-user knowledge of a physical location and configuration of a system and/or a device that delivers the services. As shown, cloud computing environment 230 may include compliance platform 220 and computing resources 225.

Computing resource 225 includes one or more personal computers, workstation computers, server devices, or another type of computation and/or communication device. In some implementations, computing resource 225 may host compliance platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by vendor device 210. Application 225-1 may eliminate a need to install and execute the software applications on vendor device 210. For example, application 225-1 may include software associated with compliance platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., vendor device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
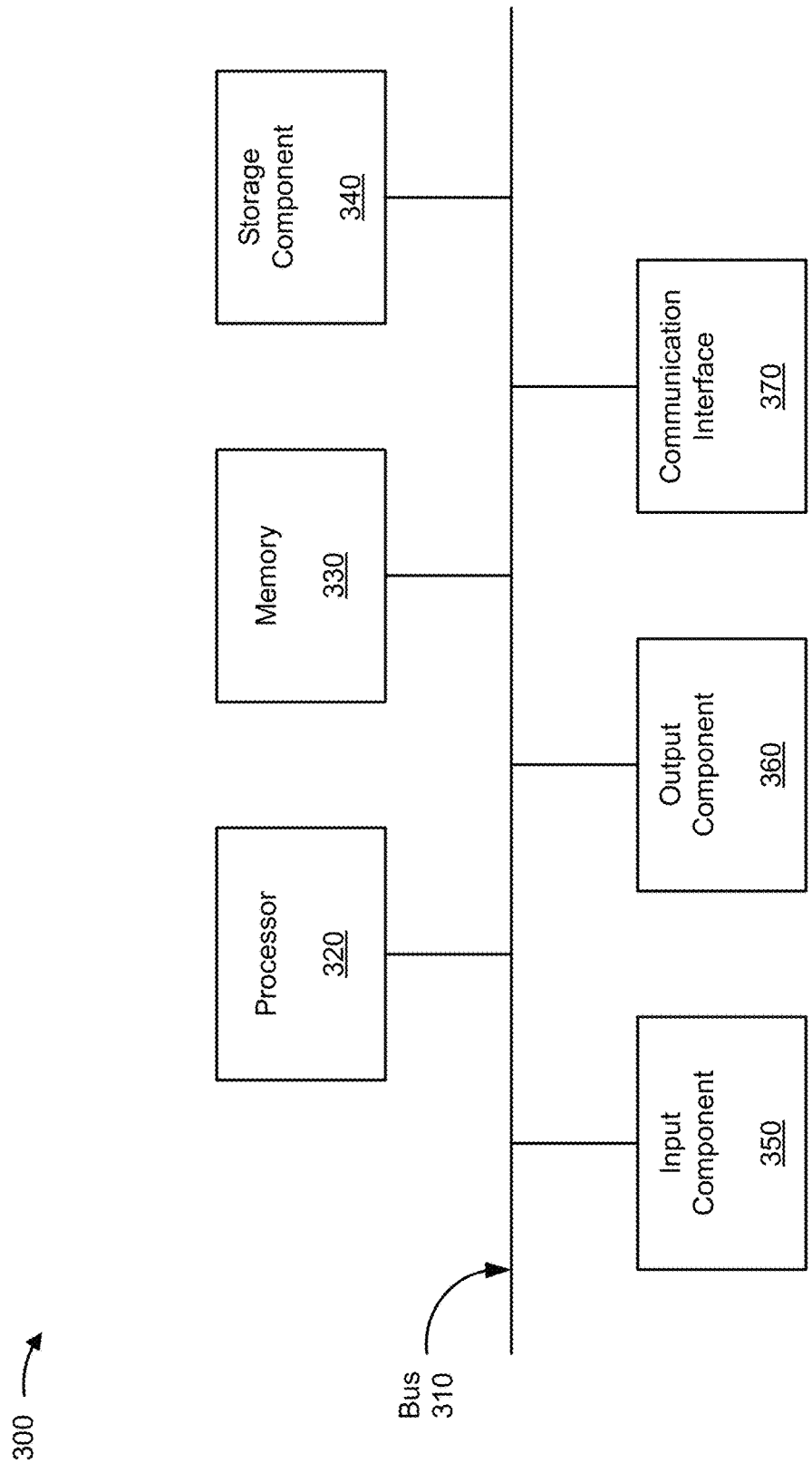
FIG. 3 is a diagram of example components of one or more devices of FIG. 2.

FIG. 3 is a diagram of example components of a device 300. Device 300 may correspond to vendor device 210 and/or computing resource 225. In some implementations, vendor device 210 and computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
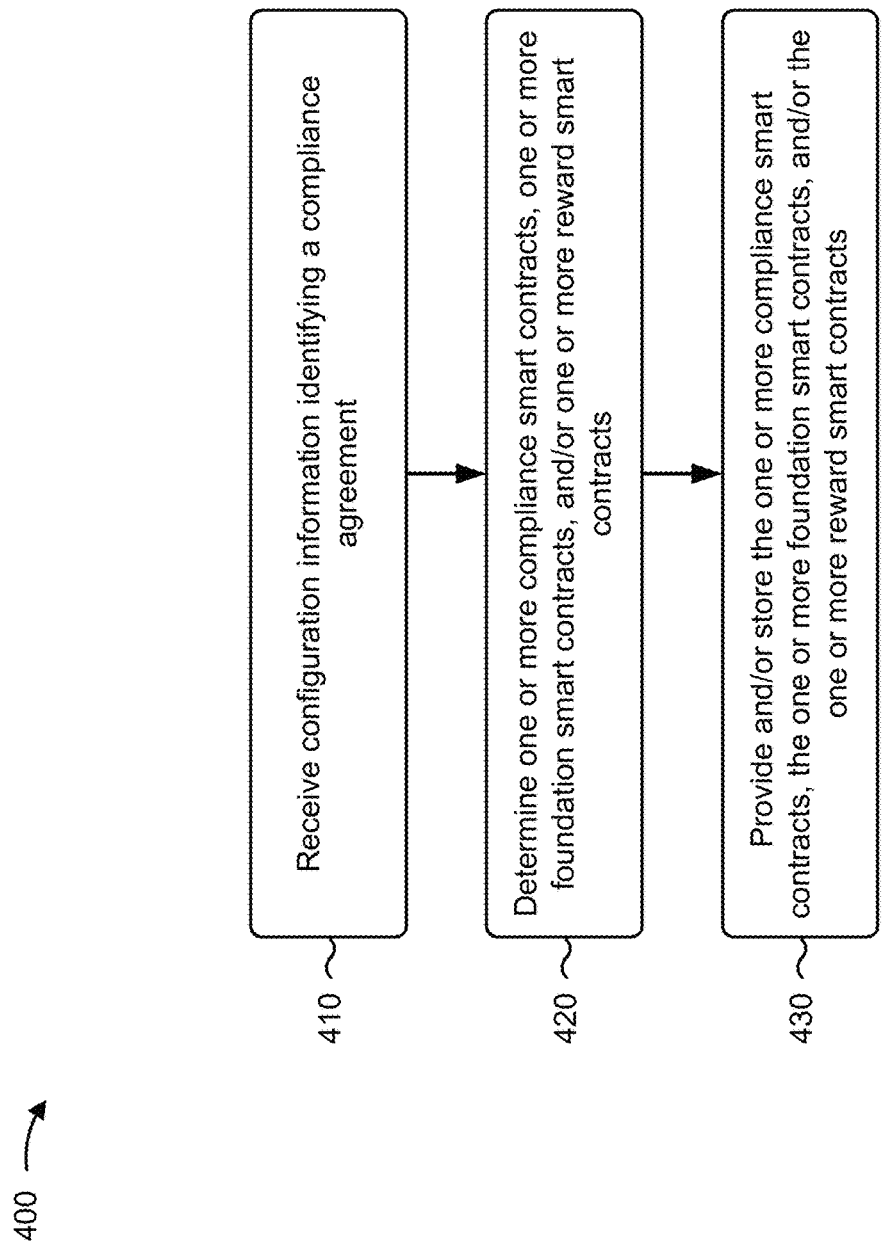
FIG. 4 is a flow chart of an example process for generating smart contracts for software assurance and trust in a distributed delivery environment.

FIG. 4 is a flow chart of an example process 400 for generating smart contracts for software assurance and trust in a distributed delivery environment. In some implementations, one or more process blocks of FIG. 4 may be performed by compliance platform 220. In some implementations, one or more process blocks of FIG. 4 may be performed by another device or a group of devices separate from or including compliance platform 220, such as vendor device 210.

As shown in FIG. 4, process 400 may include receiving configuration information identifying a compliance agreement (block 410). For example, compliance platform 220 may receive (e.g., using computing resource 225, processor 320, communication interface 370, and/or the like) configuration information. The configuration information may include information for determining whether a counterparty (e.g., a software developer or any other entity) is compliant with one or more compliance requirements. The configuration information may include a compliance agreement, which may identify at least one of the one or more compliance requirements.

In some implementations, a compliance requirement may be determined by an entity associated with compliance platform 220. For example, a party who contracts with a counterparty may determine the compliance requirement. In some implementations, a compliance requirement may be determined based on an agreement between a party and a counterparty. For example, the party and the counterparty may negotiate the compliance requirement, and may provide information identifying the compliance requirement to compliance platform 220.

In some implementations, compliance platform 220 may receive the configuration information from a user device associated with compliance platform 220. Additionally, or alternatively, compliance platform 220 may receive the configuration information from vendor device 210. For example, a counterparty (e.g., a software vendor and/or the like) may provide configuration information regarding a software environment associated with vendor device 210.

In some implementations, the configuration information may identify information associated with a vendor. For example, the configuration information may identify one or more vendors for which compliance is to be determined. As another example, the configuration information may identify monetary resources of a vendor (e.g., a bank account associated with the vendor, a cryptocurrency address associated with the vendor, etc.) to be used for reward or penalty payment. As yet another example, the configuration information may identify payment information for a vendor for completion of an escrow payment by the vendor.

In some implementations, the configuration information may identify one or more modules of a software environment. For example, the configuration information may identify a module, whether the module is open-source, a license associated with the module (e.g., Apache, MIT, etc.), a version of the module, a vulnerability rating of the module, a security configuration of the module, and/or the like.

In some implementations, the configuration information may identify a compliance requirement to be enforced with regard to the counterparty. A compliance requirement may include a requirement relating to software compliance. Software compliance is a state of being in accordance with established guidelines or specifications, or the process of becoming so. For example, software may be developed in compliance with specifications created by a standards body, and then deployed by user organizations in compliance with a vendor's licensing agreement. A compliance requirement may include any condition or logical test that can be determined based on data and using a smart contract. For example, a compliance requirement may relate to a process-level business compliance, a software-level business compliance, a software-level functional compliance, a software infrastructure compliance, a software build component compliance, and/or another type of compliance.

As further shown in FIG. 4, process 400 may include determining one or more compliance smart contracts, one or more foundation smart contracts, and/or one or more reward smart contracts (block 420). For example, compliance platform 220 may determine (e.g., using computing resource 225, processor 320, and/or the like) smart contracts based on the configuration information. Compliance platform 220 may determine the smart contracts to enable determination of compliance with compliance requirements based on the blockchain, and to enable automatic reward or penalty payment based on the blockchain. Three examples of smart contracts, described herein, are the foundation smart contract, the compliance smart contract, and the reward smart contract. Each is described in turn below.

A foundation smart contract, as described herein, may be a smart contract that performs a task related to assembling or collecting data for a blockchain, such as a compliance blockchain described herein. For example, a foundation smart contract may include a compliance data extractor (e.g., to extract compliance data from a software environment), a compliance metadata generator (e.g., to generate metadata regarding extracted data), a software build service composer (e.g., to generate a service to extract data from a software environment), a reward generator, and/or the like.

A compliance smart contract may be a smart contract that corresponds to a compliance requirement. For example, a compliance smart contract may determine whether a compliance requirement is satisfied based on compliance information that is determined according to data extracted from a software environment (e.g., based on a foundation smart contract, as described above). In some implementations, a compliance smart contract may be automatically generated based on a compliance requirement, as described in more detail below. A compliance smart contract (or a device executing a compliance smart contract) may receive, as input, compliance information, and may output a blockchain block (or a part of a blockchain block) indicating compliance or noncompliance with the compliance requirement. In some implementations, a compliance smart contract may include, for example, a license verification smart contract, a security validation smart contract, and/or the like.

A reward smart contract may be a smart contract that provides a reward or penalty to a counterparty (e.g., a vendor) based on an output of one or more compliance smart contracts. For example, a reward smart contract may define a reward threshold for a compliance score that is determined based on the output of the one or more compliance smart contracts. When the threshold is satisfied, payment of a reward may be triggered based on the reward smart contract. When the threshold is not satisfied, nonpayment of the reward and/or payment of a penalty may be triggered based on the reward smart contract. In some implementations, a reward smart contract may be based on multiple, different thresholds. For example, a first reward payment may be triggered when a first threshold is satisfied, and a second reward payment may be triggered when a second threshold (e.g., higher than the first threshold) is satisfied. Additionally, or alternatively, a larger reward payment may be triggered when a score satisfies a first threshold than when the score satisfies the second threshold.

In some implementations, compliance platform 220 may determine a compliance smart contract. For example, compliance platform 220 may automatically determine a compliance smart contract. Compliance platform 220 may determine a compliance smart contract based on a compliance requirement. For example, compliance platform 220 may receive information identifying a compliance requirement, and may determine a logical test to determine whether the compliance requirement is satisfied. Compliance platform 220 may generate a compliance smart contract based on the logical test. When executing the compliance smart contract, compliance platform 220 may receive, as input, compliance information relating to the compliance requirement. Compliance platform 220 may output a blockchain block indicating whether the compliance requirement is satisfied with regard to the compliance information.

As further shown in FIG. 4, process 400 may include providing and/or storing the one or more compliance smart contracts, the one or more foundation smart contracts, and/or the one or more reward smart contracts (block 430). For example, compliance platform 220 may provide and/or store (e.g., using computing resource 225, processor 320, memory 330, storage component 340, communication interface 370, and/or the like) the smart contracts. In some implementations, compliance platform 220 may generate a blockchain and/or a block of a blockchain based on the smart contracts. For example, compliance platform 220 may publish one or more smart contracts to a blockchain. This may allow the one or more smart contracts to access compliance information that is published to the blockchain, thereby enabling transparent and trusted determination of compliance with compliance requirements using the blockchain and smart contracts.

In some implementations, compliance platform 220 may generate an extraction service based on the one or more foundation smart contracts. For example, a service composer smart contract may use module information and/or configuration information to generate a software service, such as an extraction service. The extraction service, when implemented by vendor device 210, may monitor software activity (e.g., successful build, test completion, etc.), and may capture relevant compliance information. Next, the extraction service may compose the various heterogeneously-formatted data into a predefined metadata format for each compliance requirement, and may upload the formatted data to the repository. Compliance platform 220 may deploy the extraction service to a software environment associated with a vendor. For example, compliance platform 220 may upload the extraction service to a repository, and may publish, to the blockchain, a block indicating an address (e.g., uniform resource locator (URL), uniform resource identifier (URI), file transfer protocol (FTP) address, etc.) associated with the extraction service. Vendor device 210 may read the address from the blockchain and obtain the extraction service accordingly. In this way, an extraction service is automatically implemented in a software environment to obtain data relating to compliance requirements. Thus, the data is more trustworthy than when provided by the vendor associated with vendor device 210, and organizational resources are conserved that would otherwise be used to manually determine this data.

In some implementations, on successful build of a software module, the extraction service may analyze a build file associated with the software and/or extract third-party component information from the build file (e.g., a Maven POM file, a gradle file, a node module package file, etc.) for a 'third party component' compliance requirement. The build file may be different for different build tools associated with different languages. For example, when a Java language uses a Maven build tool, then the extraction service may extract the third-party component information from a POM file, generated by the build tool, that identifies the name of the third-party component (identified by an artifact identifier) and/or a version of the build tool used.

In some implementations, compliance platform 220 may obtain information associated with a third-party component based on the information gathered by the extraction component. For example, compliance platform 220 may connect to one or more repositories to obtain such information. As a more particular example, in the maven case, compliance platform 220 may connect to a maven repository (e.g., using an API call) to obtain information associated with the software component (e.g., a license type, etc.). As another example, compliance platform 220 may obtain information associated with the software component from a vulnerability repository (e.g., a National Checklist Program Repository (NVD), a Common Vulnerabilities and Exposures (CVE) repository, etc.) to determine a vulnerability associated with the software component, and may use the information associated with the software component to determine a score (e.g., based on criticality of the vulnerability).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
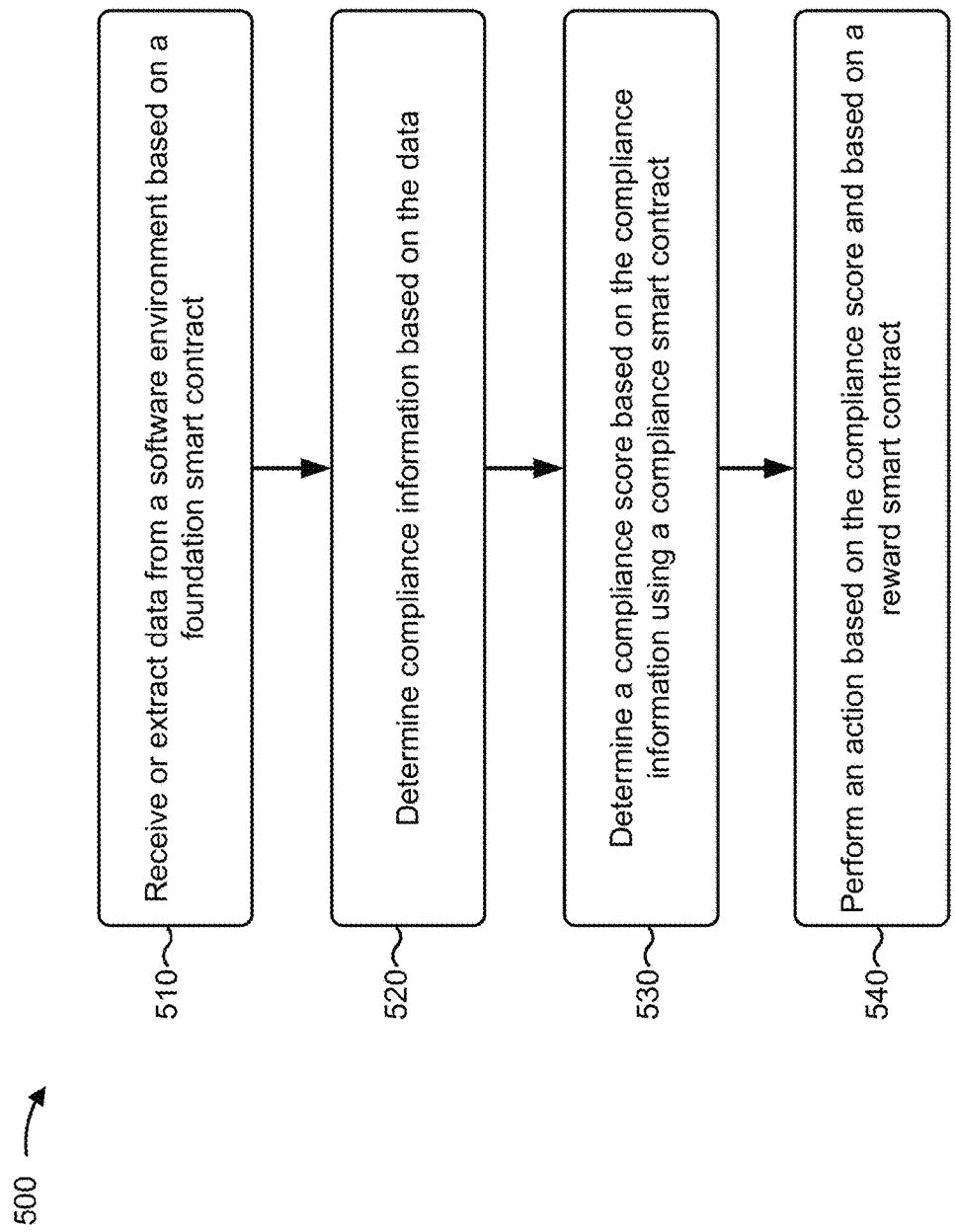
FIG. 5 is a flow chart of an example process for determining compliance information based on smart contracts in a distributed delivery environment.

FIG. 5 is a flow chart of an example process 500 for determining compliance information based on smart contracts in a distributed delivery environment. In some implementations, one or more process blocks of FIG. 5 may be performed by compliance platform 220. In some implementations, one or more process blocks of FIG. 5 may be performed by another device or a group of devices separate from or including compliance platform 220, such as vendor device 210.

As shown in FIG. 5, process 500 may receiving or extracting data from a software environment based on a foundation smart contract (block 510). For example, compliance platform 220 may receive or extract (e.g., using computing resource 225, processor 320, communication interface 370, and/or the like) data from a software environment. The software environment may be associated with a counterparty (e.g., a vendor, etc.) for which a compliance score is to be determined. In some implementations, compliance platform 220 may receive or extract the data based on a foundation smart contract. For example, the foundation smart contract may generate an extraction service that may be implemented in the software environment (e.g., on vendor device 210). Compliance platform 220 may receive the data from the extraction service (e.g., from vendor device 210). As described herein, in some implementations, a software environment may include a software development environment or ecosystem. For example, a vendor environment or ecosystem may include infrastructure that is used to support the execution of a software task, such as development, testing, and/or the like. This infrastructure includes the tools, framework, and software, such as code repositories, build tools, lifecycle management tools, and/or the like, to complete software delivery tasks. For example, GITHUB for code repository, Java language for code development, and Maven for build are examples of software environments.

The data may include information regarding the software environment to be used to determine compliance information and/or a compliance score for the software environment and/or for a module or software developed in the software environment. For example, the data may include information identifying a vendor, information identifying a module, information identifying a programming language, information identifying a storage configuration or architecture, information identifying a visualization configuration, information identifying a build, information identifying a code repository, information identifying a version number associated with one or more of the above configurations, a description of the module or software, a build number, a package name, information identifying a license, and/or other information.

In some implementations, compliance platform 220 or vendor device 210 may process the data. For example, compliance platform 220 may determine metadata based on the data. In some implementations, the metadata for a module may specify or indicate a module identifier, a module name, a module description, a module build number, information regarding one or more components of the module, and/or the like. In some implementations, the information regarding the one or more components may specify or indicate a package name, a component name, a license type, a version, a build tool associated with the module, and/or the like.

In some implementations, compliance platform 220 may generate a blockchain block based on the data and/or the metadata. For example, compliance platform 220 may generate a blockchain block that identifies the data and/or the metadata. Additionally, or alternatively, compliance platform 220 may generate a blockchain block that identifies a location where the data and/or the metadata is stored (e.g., an address, etc.). Additionally, or alternatively, compliance platform 220 may generate multiple, different data sets for different build components, and may publish one or more blocks based on the multiple, different data sets. For example, compliance platform 220 may generate a single block including a combination of the multiple, different data sets, or may publish two or more data sets to different blocks.

As further shown in FIG. 5, process 500 may include determining compliance information based on the data (block 520). For example, compliance platform 220 may use (e.g., using computing resource 225, processor 320, and/or the like) one or more compliance smart contracts to determine compliance information based on the data. In some implementations, compliance platform 220 may determine compliance information based on metadata that describes or is associated with the data. The one or more compliance smart contracts may receive, as input, the data or metadata, and may output compliance information. The compliance information outputted by a compliance smart contract may indicate whether a corresponding compliance requirement is satisfied for a particular software environment, software, and/or module. Additionally, or alternatively, the compliance information may indicate a score or value associated with the corresponding compliance requirement.

In some implementations, compliance platform 220 may publish the compliance information to a blockchain. For example, compliance platform 220 may generate one or more blockchain blocks that include the compliance information or identify a location of the compliance information. Additionally, or alternatively, compliance platform 220 may generate a blockchain block, or a part of a blockchain block, for each compliance smart contract that processes the data or metadata. For example, compliance platform 220 may generate a first blockchain block for a license compliance smart contract, may generate a second blockchain block for a security compliance smart contract, and so on. Additionally, or alternatively, compliance platform 220 may add compliance information to a blockchain block and republish the blockchain block. For example, a first iteration of the blockchain block may include headers or categories for the compliance information, and a second iteration of the blockchain block may include values corresponding to the headers or categories.

As an example, assume that metadata associated with a first module indicates that the first module is associated with a license type of MIT (corresponding to an MIT open source license) and assume that metadata associated with a second module indicates that the second module is associated with a license type of GPL (GNU General Public License). Assume further that compliance platform 220 generates a compliance smart contract based on a compliance requirement that requires an MIT license type for modules. In that case, the compliance smart contract may receive, as input, the metadata. The compliance smart contract may output a first value for the first module (e.g., yes, 1, etc.) based on the first module satisfying the MIT license type, and may output a second value for the second module (e.g., no, 0, etc.) based on the second module not satisfying the MIT license type.

As further shown in FIG. 5, process 500 may include determining a compliance score based on the compliance information using a compliance smart contract (block 530). For example, compliance platform 220 may determine (e.g., using computing resource 225, processor 320, and/or the like) a compliance score based on the compliance information. Compliance platform 220 may determine the compliance score using a compliance smart contract. For example, compliance platform 220 may store or have access to a compliance smart contract that generates a compliance score based on the compliance information. In some implementations, the compliance score may be a composite compliance score based on values determined for each compliance requirement. For example, the compliance score may be an average compliance score, a median compliance score, a highest compliance score, a lowest compliance score, a weighted average compliance score, a total compliance score, and/or the like. As another example, the compliance score may be based on any combination of two or more compliance scores and/or two or more compliance information values that can be performed using smart contracts. By generating a composite compliance score, blockchain resources and resources of compliance platform 220 are conserved that would otherwise be used to store, determine, and/or manipulate multiple, different compliance scores.

In some implementations, compliance platform 220 may add the compliance score to a blockchain. For example, compliance platform 220 may generate one or more blocks that include the compliance score or identify a location of the compliance score. By identifying the compliance score in the one or more blocks, resources and time are conserved that would otherwise be used to obtain the compliance score from storage other than the blockchain. By identifying a location of the compliance score in the one or more blocks, blockchain resources are conserved. Additionally, or alternatively, compliance platform 220 may add compliance information to a new iteration of a block of the blockchain. For example, a first iteration of the block may include compliance information, and a second iteration of the block may include compliance scores corresponding to (e.g., based on) the compliance information.

In some implementations, compliance platform 220 may determine the compliance score based on a weighted value. For example, compliance platform 220 may determine that a first compliance score is to be weighted more heavily than a second compliance score. Compliance platform 220 may use a technique such as a weighted average to determine a composite compliance score based on the first compliance score and the second compliance score. In this way, some compliance requirements (e.g., particularly important or valuable compliance requirements) may be weighted more heavily than other compliance requirements.

As further shown in FIG. 5, process 500 may include performing an action based on the compliance score and based on a reward smart contract (block 540). For example, compliance platform 220 may perform (e.g., using computing resource 225, processor 320, memory 330, storage component 340, communication interface 370, and/or the like) an action based on the compliance score. In some implementations, the action may be based on a reward smart contract. For example, compliance platform 220 may allocate a reward or penalty of a blockchain-based currency based on the reward smart contract. Additionally, or alternatively, compliance platform 220 may allocate a reward or penalty of an escrow account based on the reward smart contract. In some implementations, compliance platform 220 may add a block or transaction to the blockchain indicating the action. For example, compliance platform 220 may add a block or transaction to pay a reward or penalty. In some implementations, the block or transaction may identify the compliance score and/or information associated with the compliance score. For example, the block or transaction may identify particular areas in which a compliance requirement is not satisfied, and/or may identify particular areas in which a compliance requirement is satisfied.

In some implementations, compliance platform 220 may notify vendor device 210 of a compliance score. Additionally, or alternatively, compliance platform 220 may notify vendor device 210 when one or more compliance scores satisfy a threshold or do not satisfy a threshold. Additionally, or alternatively, compliance platform 220 may provide a recommendation regarding a compliance score. For example, compliance platform 220 may recommend a particular build, security feature, license, and/or the like, so that a compliance requirement is satisfied. In some implementations, compliance platform 220 may terminate a relationship with a counterparty (e.g., vendor) based on a compliance score. For example, when the compliance score satisfies a particular threshold, compliance platform 220 may automatically terminate the relationship with the counterparty.

In some implementations, the operations described in connection with processes 400 and 500 may be performed with regard to multiple, different counterparties. For example, the operations described in connection with processes 400 and 500 may be performed with regard to multisourced vendors associated with different service capabilities and delivery competencies. In such a case, in some implementations, a blockchain may be shared between compliance platform 220 and vendor devices 210 corresponding to the multiple, different counterparties. Blocks that are added to the blockchain may include information regarding any one of the multiple, different counterparties, which improves robustness of the blockchain. In some implementations, each counterparty may be associated with a respective blockchain, which may be shared between compliance platform 220 and a vendor device 210 associated with each counterparty. This may provide increased privacy and anonymity for the counterparties.

In some implementations, the operations described in connection with processes 400 and 500 may be performed for a single module or software, such as a single software deliverable. In some implementations, the operations described in connection with processes 400 and 500 may be performed with regard to multiple, different modules. For example, compliance platform 220 may determine compliance requirements that apply to individual modules, groups of modules, and/or all modules of the multiple, different modules. Compliance platform 220 may receive or extract data regarding the multiple, different modules, and may determine rewards or penalties at a per-module level, at a module group level, or at a global level, based on the data.

In some implementations, the operations described herein may be performed with regard to multiple, different milestones in development of a module or software. For example, rewards or penalties may be determined separately for each milestone, or in the aggregate for multiple, different milestones. Additionally, or alternatively, rewards or penalties may be pooled across all milestones and/or modules, or may be allocated on an individual milestone basis and/or an individual module basis.

As another example of processes described herein, compliance platform 220 may be associated with extractor services, corresponding to build files and/or software modules, to extract component data from the build files and/or software modules. Once the data is extracted, a license type extractor may connect to a repository to determine one or more license types of the build files and/or software modules. A vulnerability extractor may determine or extract a vulnerability score based on a vulnerability repository (e.g., NVD, CVE repositories). The above steps may be performed for each build component used in a development environment. Then, the data from each build component may be collated together in a single file which is then pushed into the blockchain for compliance analysis.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of an example implementation 600 relating to example processes 400 and 500 shown in FIGS. 4 and 5. FIGS. 6A-6D show an example of configuration, data preparation, compliance analysis, and reward generation according to various implementations described herein. FIGS. 6A-6D include a compliance platform, which may be compliance platform 220 and/or the compliance platform described in connection with FIGS. 1A-1C.

Figure 6A:
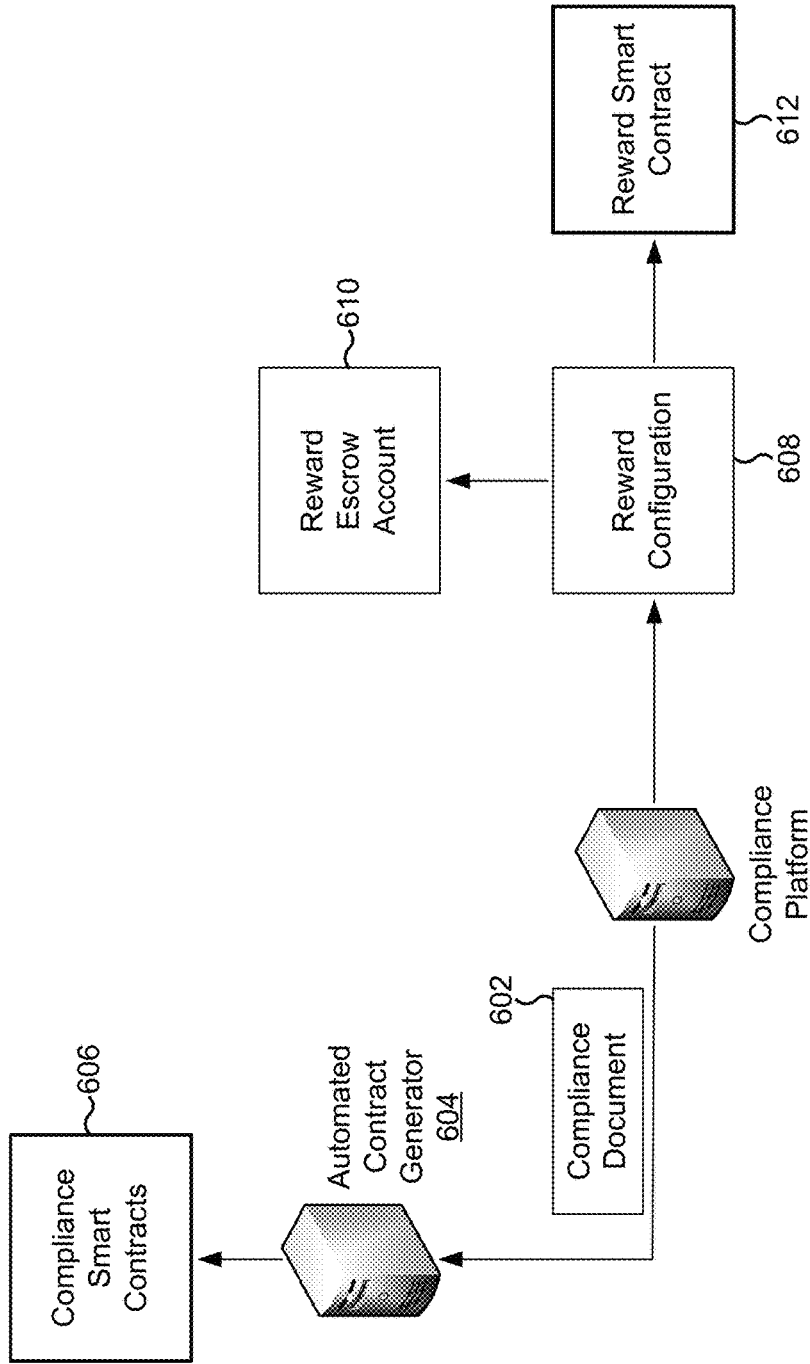
FIGS. 6A-6D are diagrams of an example implementation relating to the example processes shown in FIGS. 4 and 5.

FIG. 6A shows an example of configuration of compliance smart contracts and reward smart contracts for a compliance document 602. The compliance document 602 may identify compliance requirements and corresponding rewards or penalties associated with the compliance requirements. As shown, an automated contract generator 604 may generate one or more compliance smart contracts 606 based on the compliance document 602. For example, the automated contract generator 604 may perform natural language processing or a similar technique to determine the compliance requirements, and may generate the compliance smart contracts 606 based on the compliance requirements. Although the automated contract generator 604 is shown as a separate device from the compliance platform, in some implementations, the automated contract generator 604 may be a component of or associated with the compliance platform.

As shown by reference number 608, the compliance platform may configure rewards or penalties associated with the compliance document. For example, as shown by reference number 610, the compliance platform may configure a reward escrow account to hold funds to be used for the rewards or the penalties. As shown by reference number 612, the compliance platform may generate a reward smart contract based on the compliance document. The reward smart contract may determine the reward or penalty that is to be assessed for a particular compliance requirement.

Figure 6B:
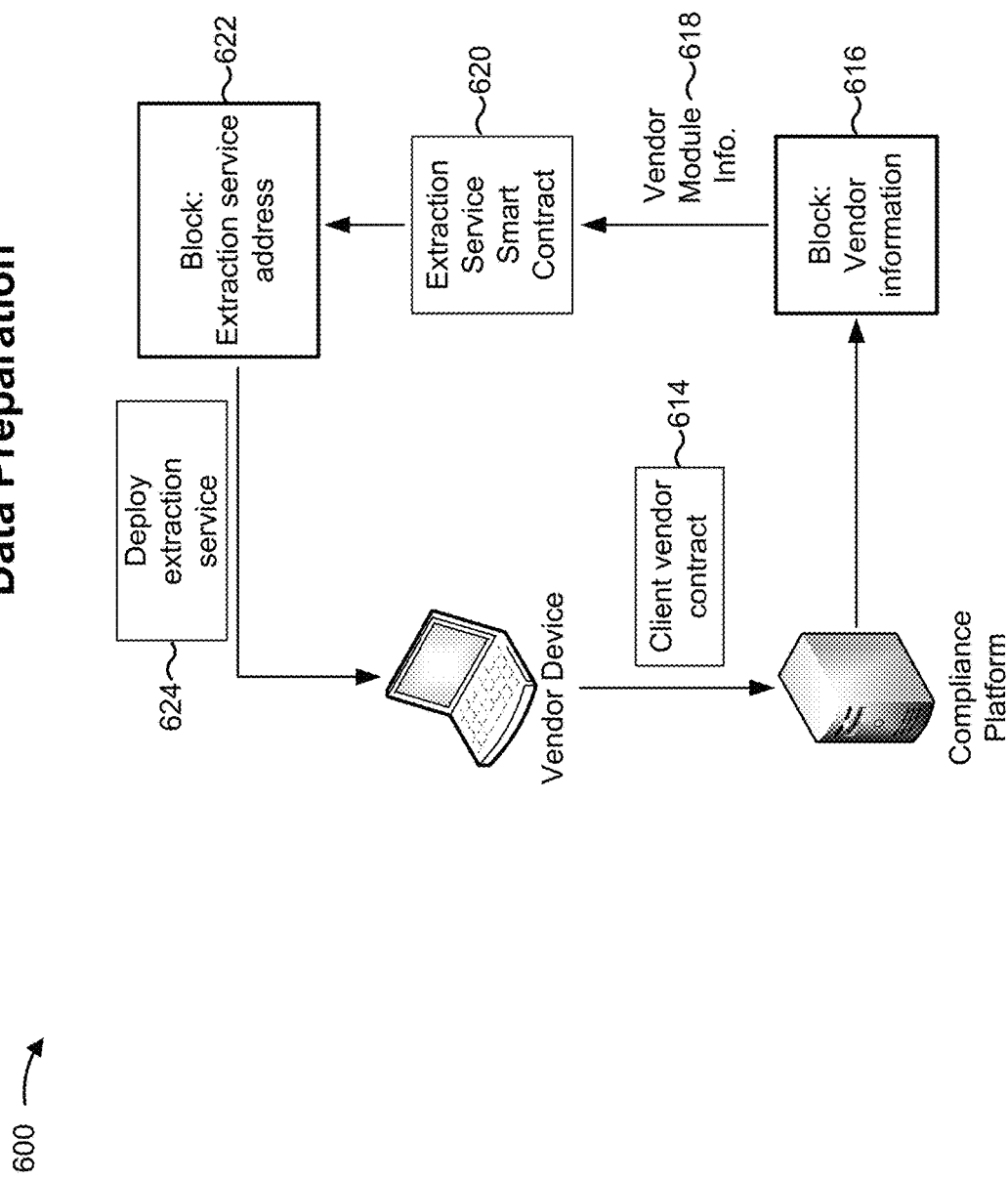

FIG. 6B shows an example of data preparation for determination of software compliance. As shown in FIG. 6B, and by reference number 614, the compliance platform may receive information identifying a client-vendor contract from the vendor device. In some implementations, the compliance platform may receive information identifying modules, components, and/or configurations of modules and/or configurations of the vendor device (e.g., and/or a software environment of the vendor device). As shown by reference number 616, the compliance platform may add a block to the blockchain identifying vendor information (e.g., the information identified by the client-vendor contract and/or the information regarding the vendor device).

As shown by reference number 618, an extraction service smart contract 620 may receive information regarding modules and/or components of the vendor device and/or a software environment associated with the vendor device. As shown by reference number 622, the extraction service smart contract 620 (e.g., and/or the compliance platform) may add a block that identifies a build service and/or an extraction service associated with the build. Furthermore, the block may identify a location (e.g., network address, storage address, etc.) that another device (e.g., the vendor device and/or the like) may use to obtain the extraction service. In this way, the location associated with the extraction service is published to the blockchain, which improves accessibility of the extraction service. Furthermore, by publishing the location of the extraction service to the block chain (e.g., as compared to publishing the extraction service itself), blockchain resources are conserved.

As shown by reference number 624, the extraction service may be deployed to the vendor device. For example, the vendor device may read the blockchain to determine the location of the extraction service, and may obtain the extraction service based on the location. Additionally, or alternatively, the compliance platform may provide the extraction service to the vendor device. The extraction service may be capable of adding information to the blockchain, such as data and/or metadata associated with the software environment (e.g., data to be used to determine compliance information and/or a compliance score). In this way, an immutable and trustworthy data publication service is used to provide data regarding the software environment, which improves reliability of determination of compliance of the software environment. Furthermore, by automatically deploying the extraction service, organizational resources are conserved that would otherwise be used to gather compliance data. Still further, raw compliance data gathered by the extraction service may be more reliable than data gathered by a human actor, due to reduced likelihood of mistakes, reduced likelihood of misunderstandings, elimination of human subjectivity, and/or the like.

Figure 6C:
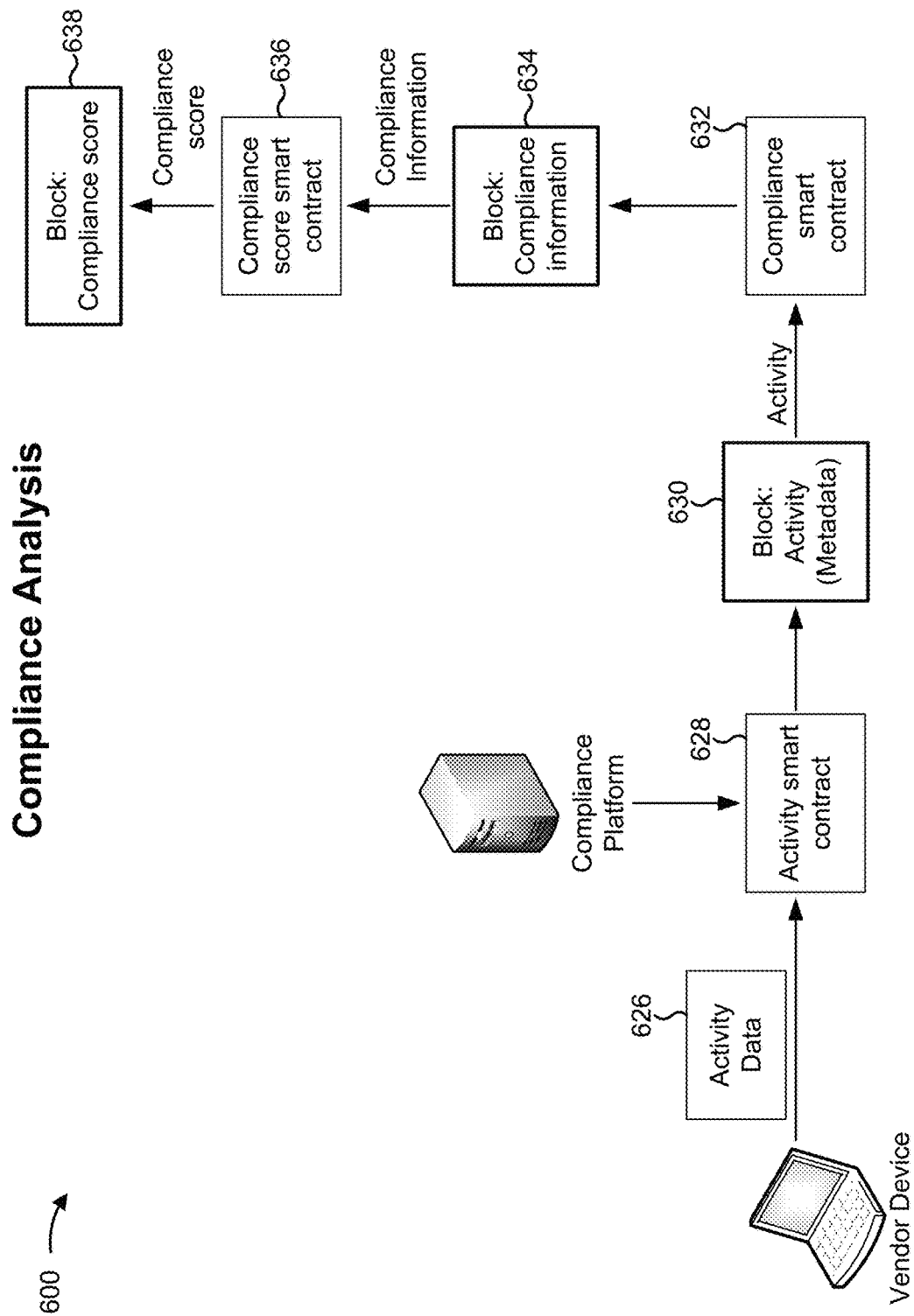

FIG. 6C shows an example of compliance analysis for determination of software compliance. As shown in FIG. 6C, and by reference number 626, the vendor device may provide data regarding activity of the software environment as an input to an activity smart contract 628. For example, the activity smart contract 628 may include a foundation smart contract that processes the data to determine metadata, which may be used to determine compliance information for the software environment and/or a vendor associated with the software environment. Here, the data is shown as "activity data," which may refer to the fact that the data relates to activity in the software environment (e.g., development activity, security activity, etc.). As shown by reference number 630, the activity smart contract 628 may determine metadata regarding the activity of the software environment, and may add a block, to the blockchain, identifying the metadata. In some implementations, the compliance platform may add the block. The metadata is described in more detail elsewhere herein.

As shown by reference number 632, a compliance smart contract may receive the metadata as input. For example, the compliance smart contract may receive, as input, metadata, and may output compliance information indicating whether the software environment and/or the activity of the software environment complies with one or more compliance requirements. In some implementations, multiple, different compliance smart contracts corresponding to multiple different compliance requirements may receive the metadata and output compliance information. As shown by reference number 634, the compliance smart contract (e.g., the compliance platform) may add a block to the blockchain identifying the compliance information.

As shown by reference number 636, a compliance score smart contract may receive the compliance information as input and may output a compliance score. In some implementations, the compliance score smart contract may determine a combined compliance score based on multiple, different compliance scores and/or multiple values of compliance information. As shown by reference number 638, the compliance score smart contract (e.g., the compliance platform) may add, to the blockchain, information identifying the compliance score (e.g., the combined compliance score, one or more compliance scores, etc.).

Figure 6D:
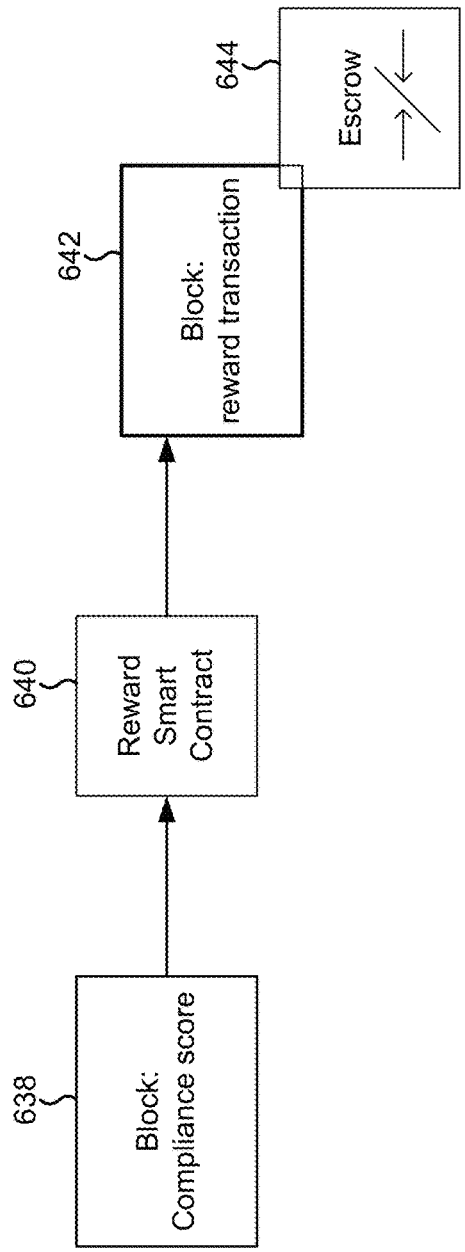

FIG. 6D shows an example of determining a reward or penalty based on a compliance score. As shown in FIG. 6D, and by reference number 640, a reward smart contract may receive, as input, a compliance score from the block identifying the compliance score (shown again by reference number 638). For example, a device executing the reward smart contract (e.g., the compliance platform and/or another device) may read the block to determine the compliance score. As shown by reference number 642, the reward smart contract may output information identifying a reward transaction. For example, the reward smart contract may determine whether the compliance score satisfies one or more thresholds, and may determine a corresponding reward or penalty based on whether the compliance score satisfies the one or more thresholds. By adding the reward transaction to the blockchain, a transaction may be performed against an escrow account (shown by reference number 644). For example, if the escrow account is associated with a digital currency (e.g., an escrow account of digital currency), the digital currency may be automatically transferred to realize the reward or penalty.

In this way, an inherently trustworthy and transparent procedure is performed to determine compliance of a software environment with one or more compliance requirements. The usage of the blockchain and smart contracts enables automatic evaluation of data and/or metadata associated with the software environment to determine compliance. Furthermore, the smart contracts enable automatic transactions to realize a reward or penalty based on the compliance. Still further, the blockchain provides an immutable and auditable history of the compliance analysis, thereby improving trust in the process. Even further, the data used to perform the compliance analysis is automatically added to the blockchain by an extraction service, which is more trustworthy and efficient than manually providing the data.

As indicated above, FIGS. 6A-6D are provided as examples. Other examples are possible and may differ from what was described with regard to FIGS. 6A-6D.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to: receive first information regarding at least one of
a software environment or
one or more modules associated with the software environment;
receive second information regarding one or more compliance requirements associated with at least one of the software environment or the one or more modules;
determine, based on the first information and the second information, one or more logical tests capable of determining whether the one or more compliance requirements are satisfied;
generate, based on the one or more logical tests, a compliance smart contract that:
receives, as input, compliance data associated with the at least one of the software environment or the one or more modules, and
provides, as output, data indicating whether the at least one of the software environment or the one or more modules meets the one or more compliance requirements;
generate, based on a foundation smart contract, an extraction service to obtain the compliance data;
determine, using the compliance smart contract and the foundation smart contract, whether the compliance data satisfies the one or more compliance requirements;
add at least part of a block, to a blockchain, to indicate whether the compliance data satisfies the one or more compliance requirements, for realization of a reward or penalty associated with the one or more compliance requirements;
add, to the at least part of the block, a compliance score, determined by using the compliance data and the compliance smart contract, the compliance score indicating a level of compliance associated with the one or more compliance requirements;
determine, using a reward smart contract and based on the at least part of the block, whether the compliance score satisfies a threshold score;
determine, based on determining whether the compliance score satisfies the threshold score, and by using the reward smart contract, the reward or penalty; and
trigger, using the reward smart contract, the realization of the reward or penalty.

2. The device of claim 1, where the one or more processors are further to:
add, to the blockchain, information identifying the extraction service or a location associated with the extraction service.

3. The device of claim 1, where the extraction service is to be implemented or executed in the software environment.

4. The device of claim 1, where the extraction service obtains the compliance data from the blockchain.

5. The device of claim 1, where the one or more processors are further to:
determine, using one or more smart contracts, metadata regarding the compliance data,
where the metadata is used to determine whether the compliance data satisfies the one or more compliance requirements.

6. The device of claim 1, where the one or more processors, when triggering the realization of the reward or penalty, are further to:
add, to the blockchain, a transaction to realize the reward or penalty.

7. The device of claim 1, where each compliance requirement, of the one or more compliance requirements, includes one or more conditions capable of being determined by the one or more logical tests.

8. The device of claim 1, where the one or more processors are further to:
extract, using the extraction service, the compliance data from the at least one of the software environment or the one or more modules.

9. The device of claim 1, where the compliance score comprises a composite compliance score that is based on values determined, using the compliance smart contract, for each of the one or more compliance requirements.

10. A method, comprising:
receiving, by one or more computer resources of a compliance platform, first information regarding a software environment;
receiving, by the one or more computer resources of the compliance platform, second information regarding one or more compliance requirements for a module or build to be developed in the software environment;
determining, by the one or more computer resources of the compliance platform and based on the first information and the second information, one or more logical tests capable of determining whether the one or more compliance requirements are satisfied;
generating, by the one or more computer resources of the compliance platform and based on the one or more logical tests, a compliance smart contract that:
receives, as input, compliance data associated with the software environment, and
provides, as output, data indicating whether the software environment meets the one or more compliance requirements;
generating, by the one or more computer resources of the compliance platform and based on a foundation smart contract, an extraction service to obtain the compliance data;
determining, by the one or more computer resources of the compliance platform and using the compliance smart contract and the foundation smart contract, whether the compliance data satisfies the one or more compliance requirements;
adding, by the one or more computer resources of the compliance platform, at least part of a block to a blockchain to indicate whether the compliance data satisfies the one or more compliance requirements, for realization of a reward or penalty associated with the one or more compliance requirements;
adding, by the one or more computer resources of the compliance platform and to the at least part of the block, a compliance score, determined by using the compliance data and the compliance smart contract, the compliance score indicating a level of compliance associated with the one or more compliance requirements;
determining, by the one or more computer resources of the compliance platform, using a reward smart contract, and based on the at least part of the block, whether the compliance score satisfies a threshold score;
determining, by the one or more computer resources of the compliance platform, based on determining whether the compliance score satisfies the threshold score, and by using the reward smart contract, the reward or penalty; and
triggering, by the one or more computer resources of the compliance platform and using the reward smart contract, the realization of the reward or penalty.

11. The method of claim 10, where triggering the realization of the reward or penalty comprises:
adding, to the blockchain, a transaction to realize the reward or penalty using a digital currency.

12. The method of claim 10, where determining whether the compliance data satisfies the one or more compliance requirements comprises:
inputting the compliance data to the compliance smart contract; and
determining, after inputting the compliance data to the compliance smart contract, whether the output of the compliance smart contract satisfies a threshold.

13. The method of claim 12, where the output of the compliance smart contract is added to the blockchain.

14. The method of claim 10, where the compliance data is associated with activity of the software environment.

15. The method of claim 10, where the compliance data describes at least one of:
a license associated with the module or build,
a version of the module or build,
a vulnerability rating of the module or build,
a security configuration of the module or build, or
an identifier of the module or build.

16. The method of claim 10, where the compliance score comprises a composite compliance score that is based on values determined, using the compliance smart contract, for each of the one or more compliance requirements.

17. A non-transitory computer-readable medium storing instructions, the instructions comprising:
one or more instructions that, when executed by one or more processors, cause the one or more processors to:
receive first information regarding at least one of
a software environment or
one or more modules associated with the software environment;
receive second information regarding one or more compliance requirements associated with the at least one of the software environment or the one or more modules;
determine, based on the first information and the second information, one or more one or more logical tests capable of determining whether the one or more compliance requirements are satisfied;
generate, based on the one or more logical tests, a compliance smart contract that:
receives, as input, compliance data associated with the at least one of the software environment or the one or more modules, and
provides, as output, data indicating whether at the least one of the software environment or the one or more modules meets the one or more compliance requirements;
generate, based on a foundation smart contract, an extraction service to obtain the compliance data;
determine, using the compliance smart contract and the foundation smart contract, whether the compliance data satisfies the one or more compliance requirements;
add at least part of a block, to a blockchain, to indicate whether the compliance data satisfies the one or more compliance requirements, for realization of a reward or penalty associated with the one or more compliance requirements;
add, to the at least part of the block, a compliance score, determined using the compliance data and the compliance smart contract, the compliance score indicating a level of compliance associated with the one or more compliance requirements;
determine, using a reward smart contract and based on the at least part of the block, whether the compliance score satisfies a threshold score;
determine, based on determining whether the compliance score satisfies the threshold score, and by using the reward smart contract, the reward or penalty; and
trigger, using the reward smart contract, the realization of the reward or penalty.

18. The non-transitory computer-readable medium of claim 17, where the one or more instructions, that cause the one or more processors to generate the extraction service, cause the one or more processors to:

automatically generate the extraction service using the first information,
> where the extraction service is configured to add the compliance data to the blockchain.

19. The non-transitory computer-readable medium of claim 17, where the one or more instructions, that cause the one or more processors to trigger the realization of the reward or penalty, further cause the one or more processors to:
   provide the at least part of the block as input to the reward smart contract; and
   add a transaction to the blockchain to cause the reward or penalty to be realized.

20. The non-transitory computer-readable medium of claim 19, where the transaction is to cause the reward or penalty to be realized with regard to an escrow account of digital currency.

* * * * *